United States Patent
Dozier et al.

(10) Patent No.: US 12,362,545 B2
(45) Date of Patent: Jul. 15, 2025

(54) FIELD ASSEMBLED MODULAR ELECTRICAL DISTRIBUTION DEVICE

(71) Applicant: Schneider Electric USA, Inc., Andover, MA (US)

(72) Inventors: Steven Wayne Dozier, Murfreesboro, TN (US); Charles Wesley Travis, Jr., Murfreesboro, TN (US); Adrian Moreno-Manzo, Murfreesboro, TN (US); James Raymond Ramsey, Murfreesboro, TN (US); Xavier Lifran, Franklin, TN (US)

(73) Assignee: Schneider Electric USA, Inc., Boston, MA (US)

( * ) Notice: Subject to any disclaimer, the term of this patent is extended or adjusted under 35 U.S.C. 154(b) by 70 days.

(21) Appl. No.: 17/920,275

(22) PCT Filed: Jul. 23, 2021

(86) PCT No.: PCT/US2021/043073
§ 371 (c)(1),
(2) Date: Oct. 20, 2022

(87) PCT Pub. No.: WO2022/020779
PCT Pub. Date: Jan. 27, 2022

(65) Prior Publication Data
US 2023/0170673 A1    Jun. 1, 2023

Related U.S. Application Data

(60) Provisional application No. 63/055,927, filed on Jul. 24, 2020, provisional application No. 63/055,938, filed on Jul. 24, 2020.

(51) Int. Cl.
*H02B 3/00* (2006.01)
*G05B 19/18* (2006.01)
(Continued)

(52) U.S. Cl.
CPC ............ *H02B 3/00* (2013.01); *G05B 19/188* (2013.01); *H01R 25/142* (2013.01); *H02B 1/04* (2013.01);
(Continued)

(58) Field of Classification Search
CPC ...................................... H02B 3/00
(Continued)

(56) References Cited

U.S. PATENT DOCUMENTS

2012/0202360 A1* 8/2012 Worley ................. H01R 35/04
439/31
2014/0160686 A1* 6/2014 Benson ............... H05K 7/2089
361/724
(Continued)

FOREIGN PATENT DOCUMENTS

CA     3095543 A1    10/2019
EP     3059814 A2    8/2016
(Continued)

OTHER PUBLICATIONS

International Search Report and Written Opinion mailed Jan. 24, 2022 in corresponding International Application No. PCT/US2021/043073, 11 pages.
(Continued)

*Primary Examiner* — Stanley Tso

(57) ABSTRACT

The present invention discloses a field assembled electrical distribution device assembled from various prepackaged modular kits. The prepackaged modular kits include all of the components required for their assembly. The prepackaged modular kits, when assembled by a certified assembler using a certified method and verification means provided by the modular kit manufacturer and one or more well know third-party certifiers, meets the requirements local, national
(Continued)

and international electrical codes and is eligible for the third-party's certification mark.

20 Claims, 16 Drawing Sheets

(51) Int. Cl.
    *H01R 25/14*     (2006.01)
    *H02B 1/04*     (2006.01)
    *H02B 1/056*     (2006.01)
    *H02B 1/20*     (2006.01)
    *H01H 71/02*     (2006.01)
    *H01H 71/08*     (2006.01)

(52) U.S. Cl.
    CPC ............... *H02B 1/056* (2013.01); *H02B 1/20* (2013.01); *G05B 2219/31396* (2013.01); *H01H 2071/0278* (2013.01); *H01H 71/08* (2013.01)

(58) Field of Classification Search
    USPC ........................................................ 361/601
    See application file for complete search history.

(56) References Cited

U.S. PATENT DOCUMENTS

| | | |
|---|---|---|
| 2016/0307477 A1 | 10/2016 | Cox et al. |
| 2017/0163021 A1 | 6/2017 | Hamilton et al. |
| 2018/0109083 A1 | 4/2018 | Fenker |

FOREIGN PATENT DOCUMENTS

| | | |
|---|---|---|
| EP | 3059814 A3 | 10/2016 |
| WO | 2019/075224 A1 | 4/2019 |

OTHER PUBLICATIONS

Extended European Search Report dated May 10, 2024 for corresponding European Patent Application No. 21845518.6-1201, 11 pages.

\* cited by examiner

FIELD ASSEMBLED MODULAR ELECTRICAL DISTRIBUTION DEVICE

PRIORITY CLAIM

This application claims priority to and benefit from the following provisional patent applications: U.S. Provisional Application Ser. No. 63/055,938 titled "Modular Switchboard Management System" filed on Jul. 24, 2020. The entire contents of this aforementioned patent application are expressly incorporated by reference herein.

TECHNICAL FIELD

The present disclosure relates to energy management, and more particularly, to field assembled modular electrical distribution devices.

BACKGROUND

Conventional factory-assembled electrical distribution devices typically come in a relatively limited number of configurations. Factory-assembled electrical distribution devices, such as switchboards and similar electrical devices, require a significant amount of copper electrical busbars that are heavy and very expensive. A fully assembled switchboard can also be large and heavy, which means shipping to the job site can be expensive and maneuvering to its final location at the job site can be very difficult. A completely assembled electrical distribution device can also be more difficult for installers to wire since some of the factory installed components block or restrict areas of the electrical distribution device where electrical connections to the utility power source and other downstream electrical distribution devices must be made. Electrical distribution devices also require third-party certification, which requires a representative of the certifying third-party to observe and compare the assembly process in the factory with assembly documentation prepared and approve by the certifying third-party or compare an assembled electrical distribution device in the factory with the third-party assembly documentation prepared and approve by the certifying third-party. If the assembled electrical distribution device meets all of the requirements of the third-party's assembly documentation the manufacturer may apply a certification label to the assembled electrical distribution device. In some instances, certification of an electrical distribution device already at its final location in the field may require certification. In these instances, a third-party representative must go to the remote location and compare a factory assembled electrical distribution device with the certifying third-party's assembly documentation. These remote certifications are very expensive and do not eliminate the problems of shipping the large electrical distribution device to the job site or maneuvering the fully assembled heavy electrical distribution device to its final location.

SUMMARY

The present invention solves the problems listed above associated with factory assembled electrical distribution devices by providing a method for assembling, in the field, at or very close to the final location of the assembled electrical distribution device, a third-party certified electrical distribution device from smaller and lighter prepackaged third-party certified modular kits.

Figure 1:
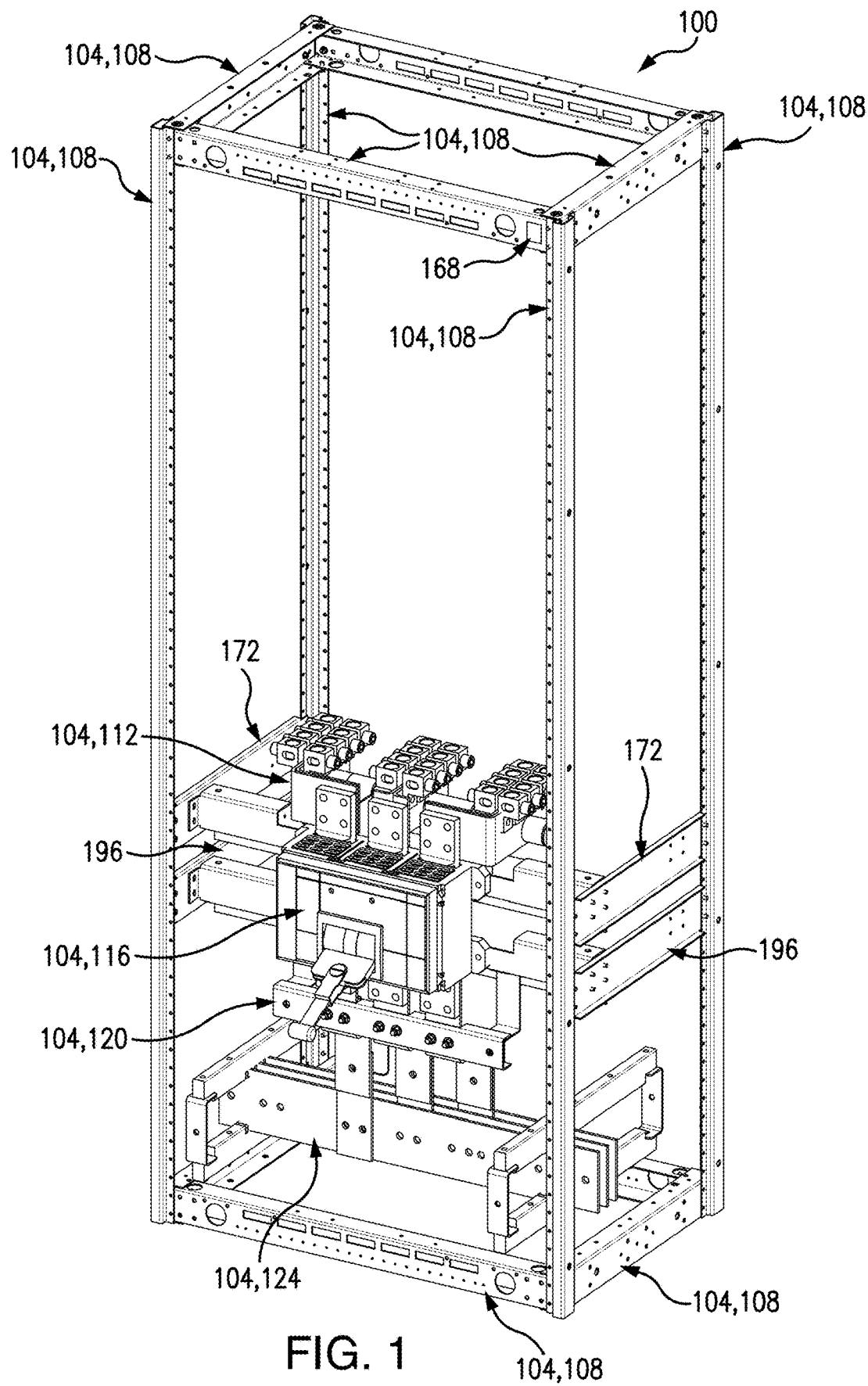
FIG. 1 illustrates a fully assembled modular electrical distribution device, according to one embodiment described herein.

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

FIG. 1 illustrates a fully assembled modular electrical distribution device 100 according to one embodiment described herein. This modular electrical distribution device 100 is constructed from various prepackaged modular kits 104, such as a frame kit 108, a line bus kit 112, a main breaker/fused switch kit 116, a load bus kit 120 and a through bus kit 124. These particular modular kits 104, when assembled, form a switchboard main section 128. Similar modular electrical distribution devices 100, can be assembled depending on the type of modular kits 104 ordered. The assembly of the various modular kits 104 required for the electrical distribution device 100 takes place at or near the final location of the electrical distribution device 100. The various modular kits 104, when assembled by an assembler certified by the modular kit manufacturer using a certified method and verification means 132 provided and approved by the modular kit 104 manufacturer and the third-party certifier, meet the requirements of third-party organizations such as Under Writer's Laboratories, Inc (UL), the National Electrical Manufacturers Association (NEMA), the International Electrotechnical Commission (IEC) and/or the American National Standards Institute (ANSI). To be certified, the assembler must successfully pass one or more training courses provide by the modular kit manufacturer or provide verifiable proof of his electrical and mechanical skills and his ability to use augmented reality in assembling a modular electrical distribution device. The assembly verification means 132 includes a digital storage repository 136 located at a remote location and accessible by the modular kit manufacturer and the certifying third-party. The digital storage repository 136 maintains information 140 about the assembly of each modular kit 104 included in the assembled modular electrical distribution device 100. This stored information 140 can include the original order number, an order specific bill of materials, listing of the ordered modular kits 104, electrical rating information, the assembly hardware used in assembling the modular kits 104, the certified assembler's certification information, the certified sequence of assembling the various modular kits 104 of the modular electrical distribution device 100, the assemblers inputs 106, visual records of the completion including digital artifacts 142 of each sequential step of the assembly of the modular electrical distribution device 100, electrical performance tests and a performance and a traceability database for recording any subsequent maintenance, usage and performance of the assembled modular electrical distribution device 100. The original order may require several frame kits 108 connected together, each housing a segment (main breaker, branch circuit breaker, utility bus, lighting panel or other similar electrical distribution devices 100) of the complete electrical distribution device 100 assembly. The stored information 140 obtained prior to and during the assembly of each modular kit 104 of a modular electrical distribution device 100, and stored in the digital storage repository 136, is used by the certifying third-party to verify that the assembled electrical distribution device 100 meets their requirements and is eligible for the application of their certification mark on the assembled modular electrical distribution device 100. Verification of each sequential step of assembling each modular kit 104 of the modular electrical distribution device 100 is accomplished by comparing inputs 106 from the certified assembler after completing each sequential step of assembling each modular kit 104 with a previously stored list of the required sequential steps for that particular modular kit 104. If the certified assembler's inputs 106 after completing each sequential step during assembly of each particular kit 104 match the previously stored list of required sequential steps, the assembled electrical distribution device 100 will be eligible for the application of the third-parties certification mark.

Figure 2:
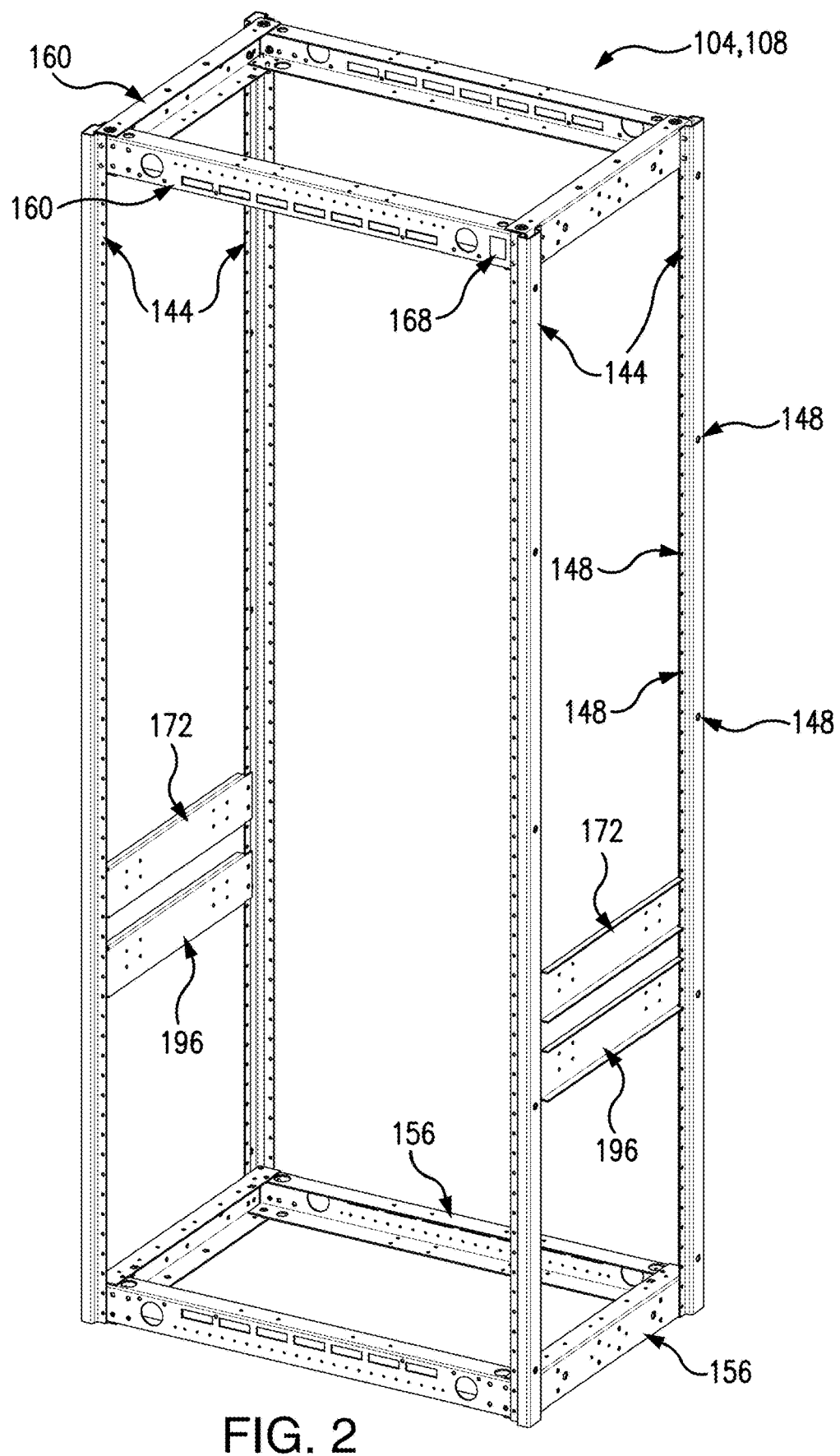
FIG. 2 illustrates a frame kit of the modular electrical distribution device, according to one embodiment described herein.

Referring now to FIG. 2, a frame kit 108 according to one embodiment described herein includes uprights 144 (generally 4-6 pieces), each made of metal. Each upright 144 having a cross-section of a particular shape which increases the strength of the uprights 144. The uprights 144 also have pre-punched holes 148 for assembly hardware 152. The frame kit 108 also includes a bottom section 156 and top section 160 (generally 4 pieces each), which also have pre-punched holes 148 for assembly hardware and a cross-section of a particular shape which increases strength of the bottom section 156 and top section 160. The bottom section 156 and top section 160 are attached to the uprights 144 by hardware 152 (screws, washers, nuts and bolts not shown) included in a hardware package 164 (not shown) prepared by the manufacturer specifically for the ordered modular frame kit 108. The hardware package 164 contains the correct number, diameter, length, thread pitch and gauge of hardware 152 required for assembling the frame kit 108. The term "hardware" as used herein is considered to be bolts, nuts, screws, washer, small brackets or any other similar items that might be required for assembly of a prepackage modular kit 104. A matrix or 2D barcode 168 attached to one member of the frame kit 108, in a position that is visible after assembly, provides access to information 140 describing each component of the frame kit 108, the proper steps for assembly, the type of hardware 152, its location in the frame kit 108 and any special tools required for assembling the frame kit 108. Augmented reality can also be used to show the certified assembler, in an approved and certified sequence, where each component of the frame kit 108 is to be installed. In one embodiment, the augmented reality device 170 and/or the assembly software with 2D or Isometric views will show the next assembly step upon determining that the current step is completed, verified and recorded in the digital storage repository 136. For example, the installation may require a special torque wrench which is capable of sending the measured torque applied to each bolted connection to the digital storage repository 136, where it is maintained. This torque information 140 may also be required for certification of the assembled frame kit 108.

Figure 3:
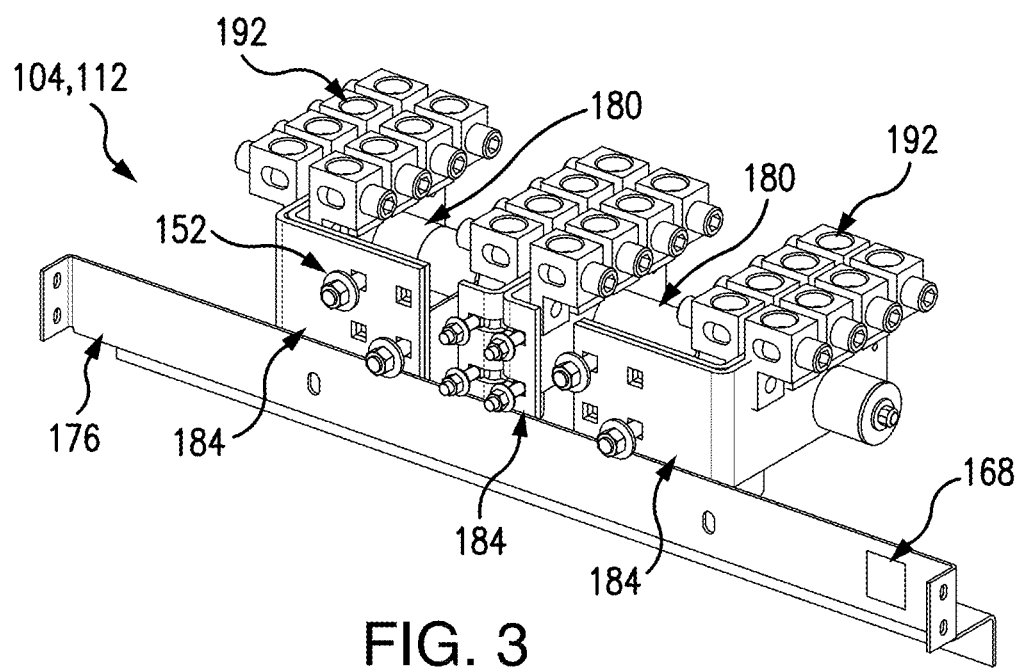
FIG. 3 illustrates a line bus kit of the modular electrical distribution device, according to one embodiment described herein.

Referring to FIG. 3, a line bus kit 112, according to one embodiment described herein, includes line bus brackets 172 (FIGS. 1 and 2) that are securely attached between the front and rear uprights 144 on each side of the frame kit 108 and a line bus subframe 176 securely attached to the line bus brackets 172. Line bus busbar supports 180 are located between and securely attached to line bus busbars 184. The line bus busbar supports 180 are made from a nonconductive material and ensure that a safe electrical clearance between the line bus busbars 184 is maintained. The Line bus busbars 184 are electrically connected the line side of a main breaker/fused switch 188 by hardware 152 and to cable lugs 192, which receive power from a utility power source or an upstream breaker/fuse device through cables (not shown). Alternate constructions my use busbars instead of cables. In either construction power can enter the frame kit 108 from the top, bottom or back of the modular electrical distribution device 100. The main breaker/fused switch 188 is securely attached to the line bus subframe 176 by hardware 152. A hardware package 164 prepared at the manufacturer specifically for the ordered line bus kit 112 contains the correct number, diameter, length, thread pitch and gauge of hardware 152 required for assembling the line bus kit 112. A matrix or 2D barcode 168 attached to one member of the line bus kit 112, in a position that is visible after assembly, provides access to information 140 describing each component of the line bus kit 112, the proper steps for assembly, the type of hardware 152, its location in line bus kit 112 and any special tools required for assembling the line bus kit 112. As discussed above, an augmented reality device 170 can also be used to show the certified assembler, in an approved and certified sequence, where each component of the line bus kit 112 is to be installed. For example, the augmented reality device 170 can be configured to show the next assembly step responsive to determining (e.g., based on analyzing received torque wrench sensor data) that the current step is completed, verified and recorded in the digital storage repository 136

Figure 4:
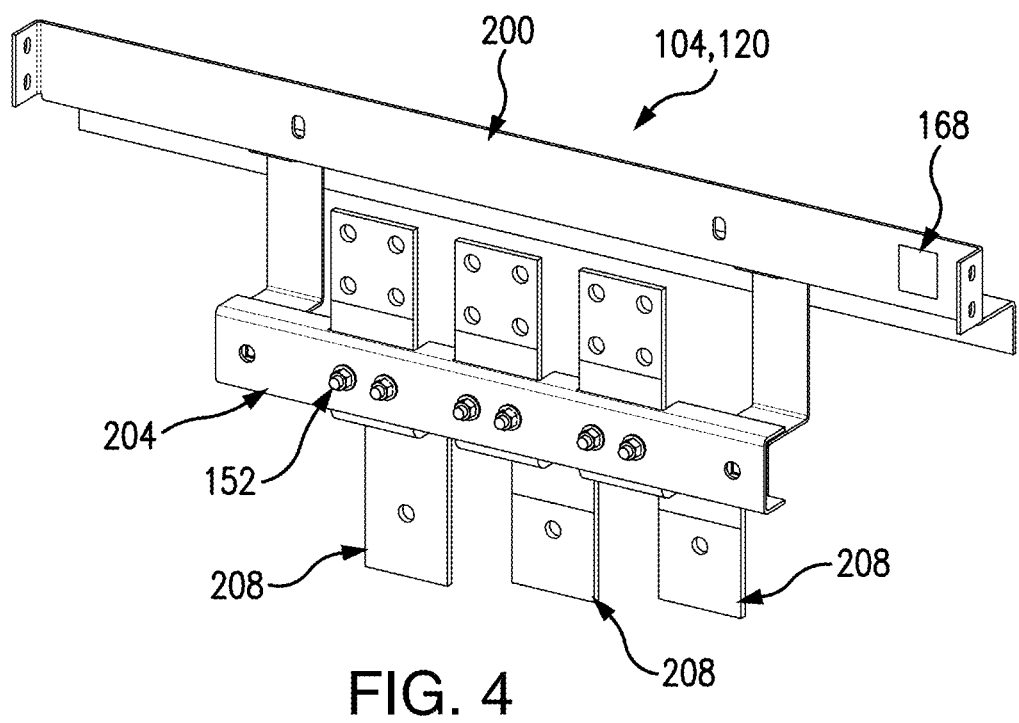
FIG. 4 illustrates a load bus kit of the modular electrical distribution device, according to one embodiment described herein.

Referring now to FIG. 4, a load bus kit 120, according to one embodiment described herein, includes load bus brackets 196 that are securely attached to the front and rear uprights 144 on each side of the frame kit 108, a load bus subframe 200 securely attached to the load bus brackets 196 (FIGS. 1 and 2) and at least one load bus busbar support 204 which is securely attached to the load bus subframe 200. The load bus busbar support 204 is made from a nonconductive material. Load bus busbars 208 are securely attached to the load bus busbar support 204 by hardware 152 such that a safe electrical clearance between the load bus busbars 208 is maintained. The load bus busbars 208 connect a main breaker/fused switch 188 to a through bus kit 124. The hardware package 164 prepared at the manufacturer specifically for the ordered load bus kit 120 contains the correct number, diameter, length, thread pitch and gauge of hardware 152 required for assembling the load bus kit 120. A matrix or 2D barcode 168 is attached to one member of the load bus kit 120, in a position that is visible after assembly, provides access to information 140 describing each component of the load bus kit 120, the proper steps for assembly, the type of hardware 152, its location in the load bus kit 120 and any special tools required for assembling the load bus kit 120. As discussed above, an augmented reality device 170 can also be used to show the certified assembler, in an approved and certified sequence, where each component of the load bus kit 120 is to be installed in a step-by-step manner, with the completion of each step being verified and recorded in a digital storage repository 136 throughout the process.

Figure 5:
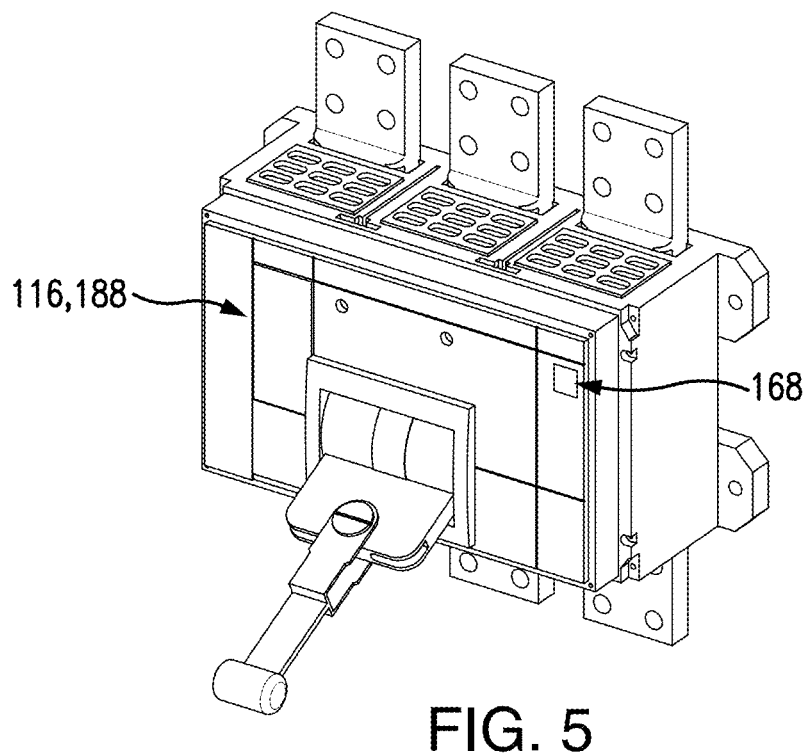
FIG. 5 illustrates a main breaker kit of the modular electrical distribution device, according to one embodiment described herein.

Referring now to FIG. 5, the main breaker/fused switch 188 is a factory assembled component and requires no further assembly other than making electrical connections to the line bus busbars 184 (FIG. 3) and load bus busbars 208 (FIG. 4). The hardware package 164 prepared at the manufacturer specifically for the ordered main breaker/fused switch 188 contains the correct number, diameter, length, thread pitch and gauge of hardware 152 required for connecting the main breaker/fused switch 188 to the line bus busbars 184 and load bus busbars 208. A matrix or 2D barcode 168 attached to a front surface of the main breaker/fused switch 188 provides access to information 140 describing the proper steps for connecting the main breaker/fused switch 188 to the line bus busbars 184 and load bus busbars 208, the type of hardware 152, its location in the assembly and any special tools required for assembly. Augmented reality can also be used to show the certified assembler, in an approved and certified sequence, where each component of the main breaker/fused switch 188 is to be installed.

Figure 6:
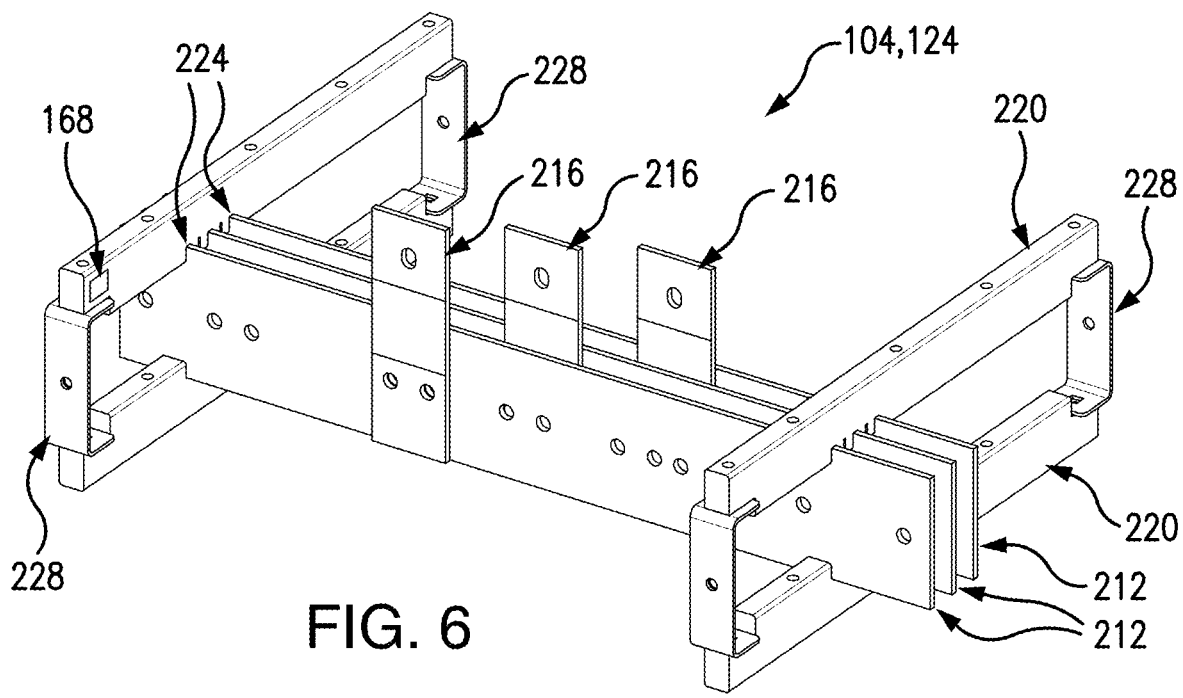
FIG. 6 illustrates a through bus kit of the modular electrical distribution device, according to one embodiment described herein.

Referring now to FIG. 6, a through bus kit 124 according to one embodiment is described herein. The through bus kit 124 provides a means for making electrical connections between the electrical devices assembled in one modular electrical distribution device 100 with electrical devices assembled in an adjacent modular electrical distribution device 100. The through bus kit 124 includes through bus busbars 212 having a length sufficient to span the inside width of one frame kit 108. The through bus kit 124 also includes through bus connector busbars 216 for making an electrical connection between the through bus busbars 212 and the load bus busbars 208 of a load bus kit 120 previously installed in the same modular electrical distribution device 100. The through bus kit 124 also includes through bus busbar supports 220 made from nonconductive material. The through bus busbar supports 220 have notches 224 for receiving an edge of the through bus busbars 212 such that a safe electrical clearance between the through bus busbars 212 is maintained. The through bus busbar supports 220 are assembled in pairs such that the through bus busbar 212 are clamped between them in the notches 224. Each pair of through bus busbar supports 220 is held together by U-shaped brackets 228 that are attached to the ends of the through bus busbar supports 220 using hardware 152. The U-shaped brackets 228 are securely attached to plates 232 (FIG. 7), which are securely attached to the frame uprights 144 by hardware 152. The hardware package 164, prepared at the manufacturer specifically for the ordered through bus kit 124 contains the correct number, diameter, length, thread pitch and gauge of hardware 152 required for assembling the through bus kit 124. A matrix or 2D barcode 168 attached to one element of the through bus kit 124 in a position visible after assembly provides access to information 140 describing each component of the through bus kit 124, the proper steps for assembly, the type of hardware 152, its location in the through bus kit 124 and any special tools required for assembling the through bus kit 124. Augmented reality can also be used to show the certified assembler, in an approved and certified sequence, where each component of the through bus kit 124 is to be installed. The augmented reality device 170 will not show the next assembly step until the current step is completed, verified and recorded in a digital storage repository 136. This installation may require a special torque wrench which is capable of sending the measured torque applied to each bolted connection to master data repository 136. The torque information 140 is required for certification of the through bus kit 124 assembly.

The electrical connections between through bus busbars 212 of one assembled modular electrical distribution device 100 and the through bus busbars 208 of an adjacent modular electrical distribution device 100 can be accomplished by bolted connector bus bars (not shown) similar to the through bus connector busbars 216, joint packs 236 (FIG. 7) and spring jaw connectors 240 (FIG. 12) or combinations of these methods on opposite ends of the through bus busbars 212. When using hardware 152 to make electrical connections a special torque wrench, which is capable of sending the measured torque applied to each bolted connection to the master data repository 136, is generally required. This torque information 140 is required for verification by the certifying third-party that the electrical connections meet the requirements for certification of the assembled modular electrical distribution device 100. The alternate methods of making electrical connections listed above will be discussed in more detail below.

Figure 7:
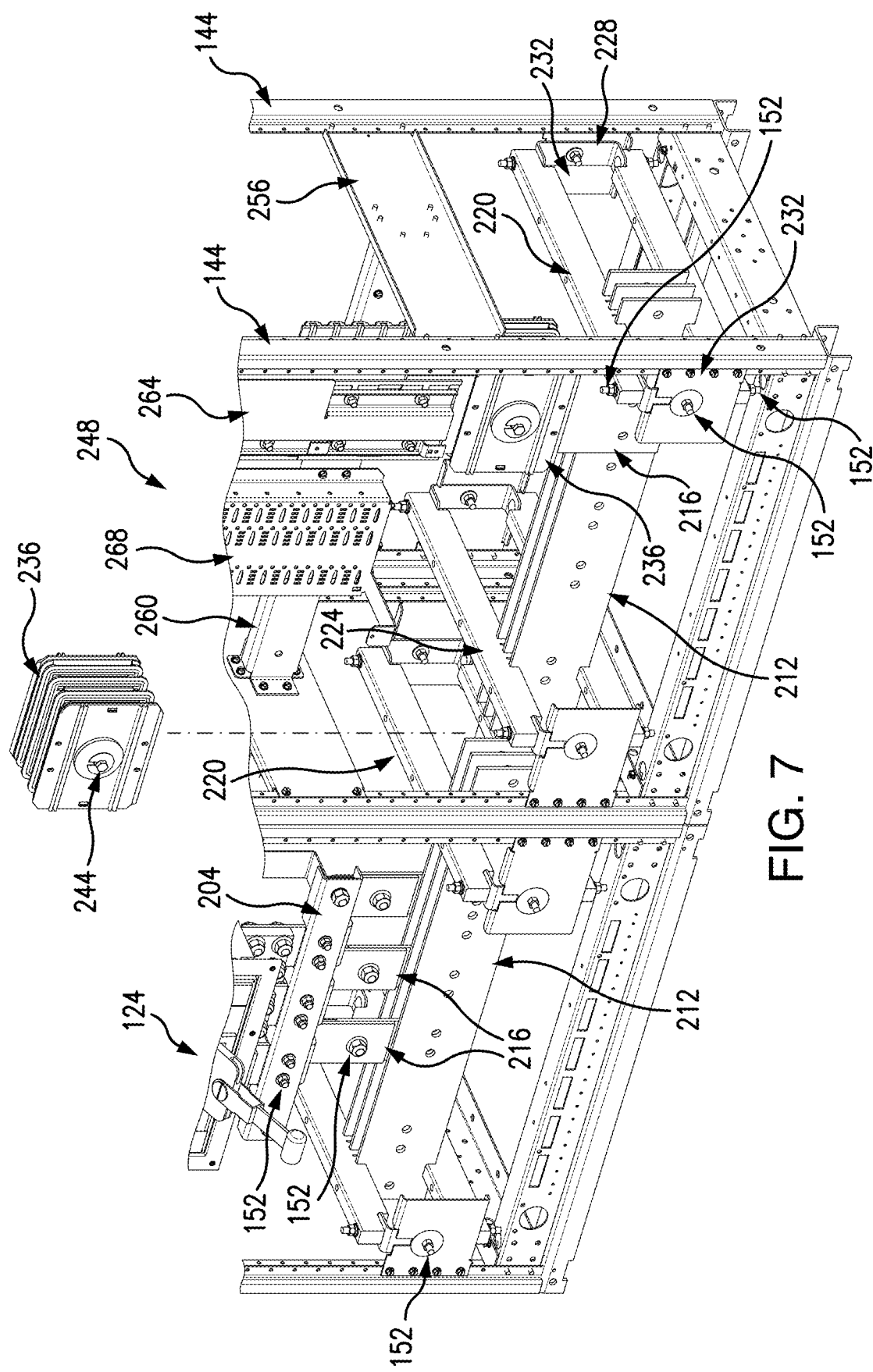
FIG. 7 illustrates the electrical connections between a modular electrical distribution device having a main breaker/fused switch and a modular electrical distribution device having a branch circuit breaker kit, according to one embodiment described herein.
Figure 8:
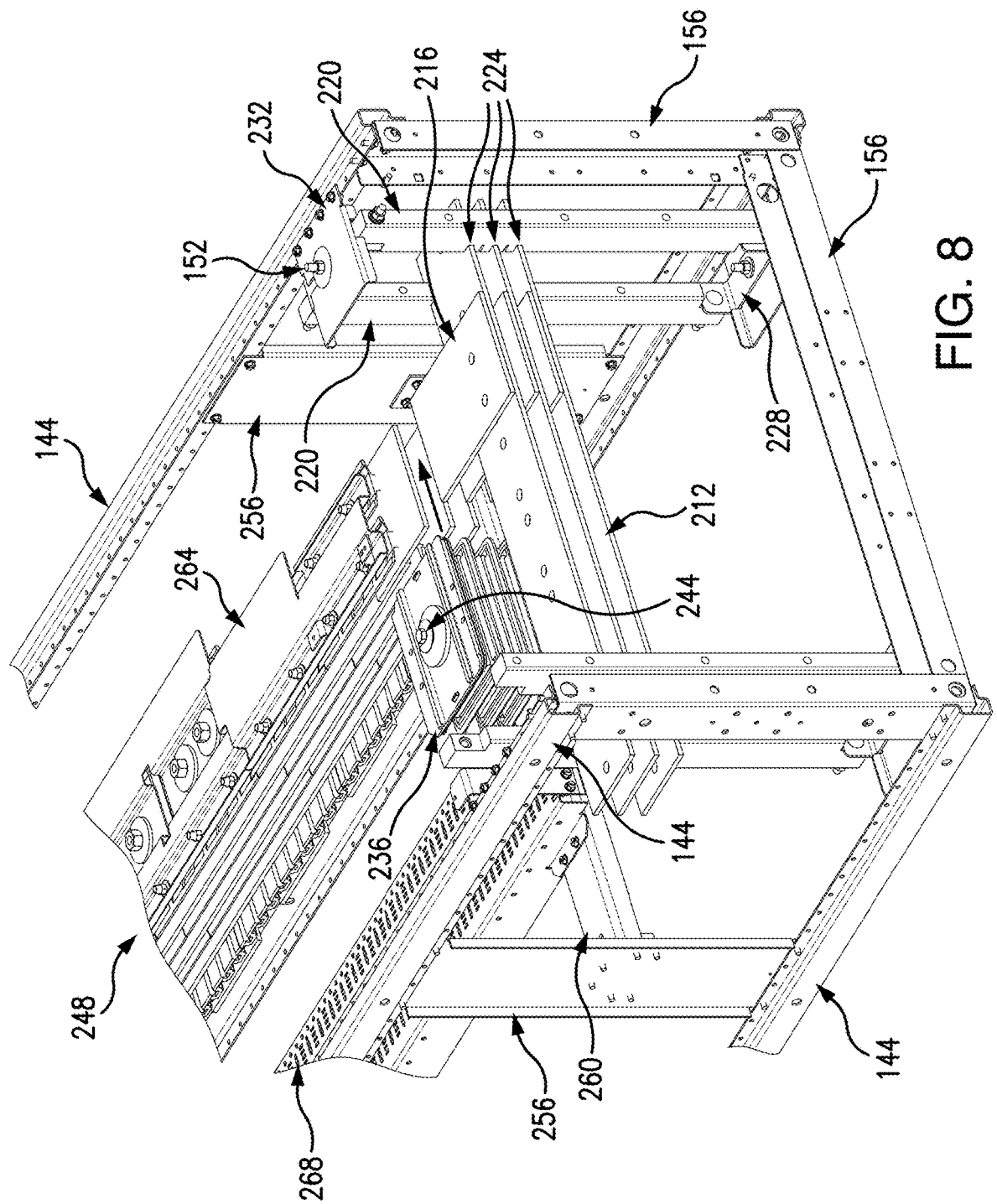
FIG. 8 illustrates in more detail the electrical connection of the through bus connector busbars of the through bus kit and the branch circuit breaker bus using a joint pack, according to one embodiment described herein.

A joint pack 236, as shown in FIG. 7, is a preassembled busbar connector which can simultaneously connect all three electrical phase busbars and an optional neutral busbar of a first modular kit 104 to all three electrical phase busbars and an optional neutral busbar of a second modular kit 104. The joint pack 236 may have a double headed bolt 244 that does not require a torque wrench to make a properly torqued electrical connection. When a joint pack 236 is used to make electrical connections between the through bus busbars 212 of a previously assembled electrical distribution device and the through bus busbars 212 of an adjacent electrical distribution device, as shown in FIGS. 7 and 8, the joint pack 236 is slidingly installed between the two through bus kits 124 and the double headed bolt 244 is tightened, using the outer bolt head, until the outer bolt head breaks off. When the outer bolt head breaks off the proper torque of approximately 70 foot/pounds for the electrical connection has been applied to the joint pack 236.

Figure 9:
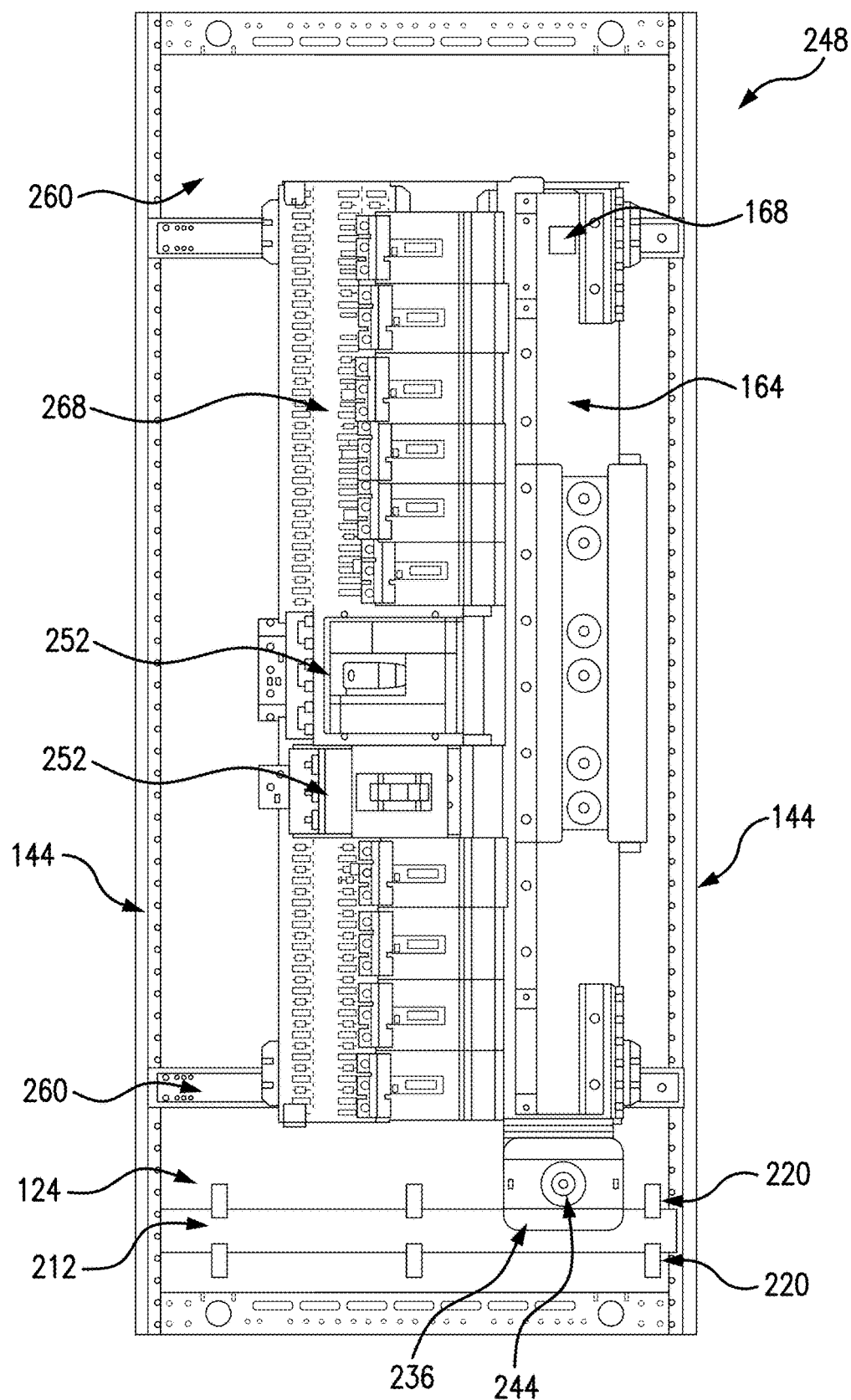
FIG. 9 illustrates in more detail the branch circuit breaker kit and a direct electrical connection of the through bus busbars of the through bus kit and the branch circuit breaker bus using a joint pack, according to one embodiment described herein.

As shown in FIG. 8, a joint pack 236 is being slidingly installed between through bus connector busbars 216 and the branch circuit breaker bus 264 of a branch circuit breaker kit 248. As shown in FIG. 9, the joint pack 236 can be installed directly between the through bus busbars 212 and the branch circuit breaker bus 264, thereby eliminating the need for the through bus connector busbars 216.

A branch circuit breaker kit 248, as shown in FIG. 9, permits a number of branch circuit breakers 252 to be installed in a small space. The branch circuit breaker kit 248 includes branch circuit breaker brackets 256 (FIGS. 7 and 8) that are securely attached to the front and rear uprights 144 on each side of the frame kit 108, and branch circuit breaker subframes 260 are securely attached to the branch circuit breaker brackets 256. A branch circuit breaker bus 264 securely attached to the branch circuit breaker subframe 260 and a circuit breaker support frame 268 is also securely attached to the branch circuit breaker subframe 260. The branch circuit breaker bus 264 is electrically connected to a through bus kit 124 and provides power to the branch circuit breakers 252, which are attached to and supported by the circuit breaker support frame 268. A matrix or 2D barcode 168 attached to one member of the branch circuit breaker kit 248, in a position visible after assembly provides access to information 140 describing each component of the branch circuit breaker kit 248, the proper steps for assembly, the type of hardware and its location in the assembly and any special tools required for assembling the branch circuit breaker kit 248. Augmented reality can also be used to show the certified assembler, in an approved and certified sequence, where each component of the branch circuit breaker kit 248 is to be installed.

Figure 10:
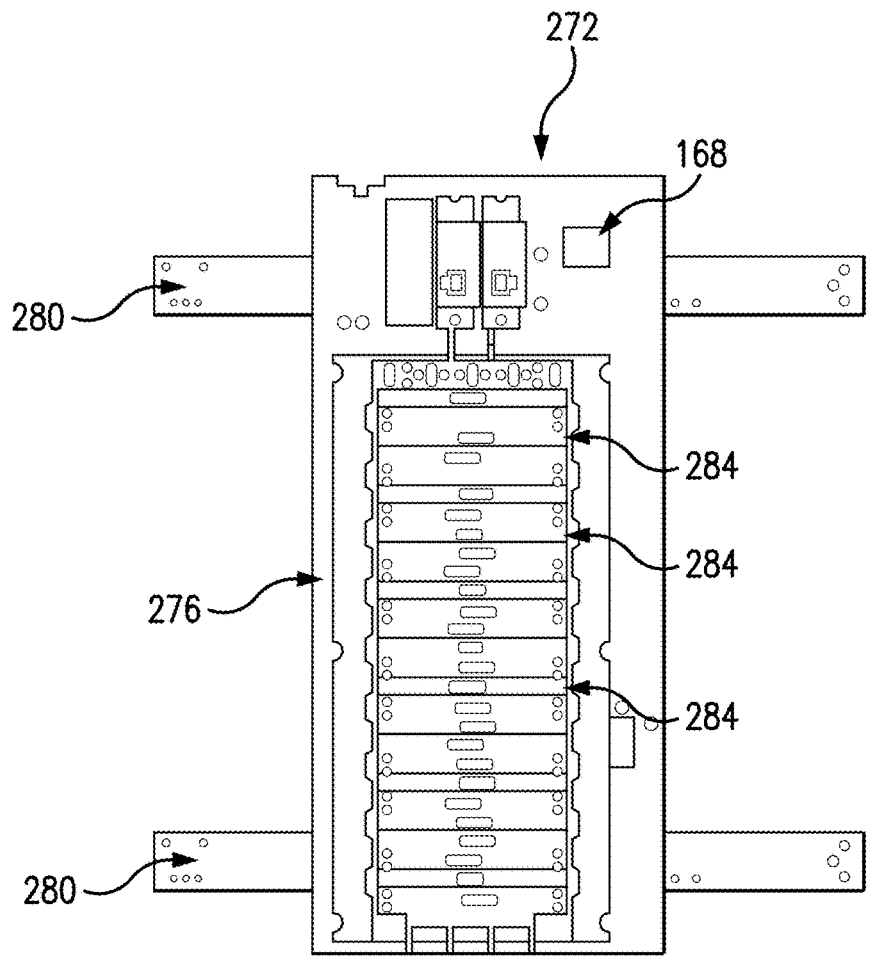
FIG. 10 illustrates a lighting panel kit, according to one embodiment described herein.

FIG. 10 illustrates a lighting panel kit 272 according to one embodiment described herein. The lighting panel kit 272 includes a lighting panel 276, lighting panel brackets (not shown) similar to the branch circuit breaker brackets 256 (FIGS. 7 and 8) that are securely attached to the front and rear uprights 144 on each side of the frame kit 108 and lighting panel subframes 280 are securely attached to the lighting panel brackets. The lighting panel 276 is securely attached to the lighting panel subframes 280. The lighting panel 276 is configured for receiving lighting control switches 284 and means similar to other modular kits 104 described herein for connecting the lighting panel 276 to a through bus kit 124. A matrix or 2D barcode 168 attached to one member of the lighting panel kit 272, in a position visible after assembly provides access to information 140 describing each component of the lighting panel kit 272, the proper steps for assembly, the type of hardware and its location in the assembly and any special tools required for assembling the lighting panel kit 272. Augmented reality can also be used to show the assembler, in an approved and certified sequence, where each component of the lighting panel kit 272 is to be installed.

Figure 11:
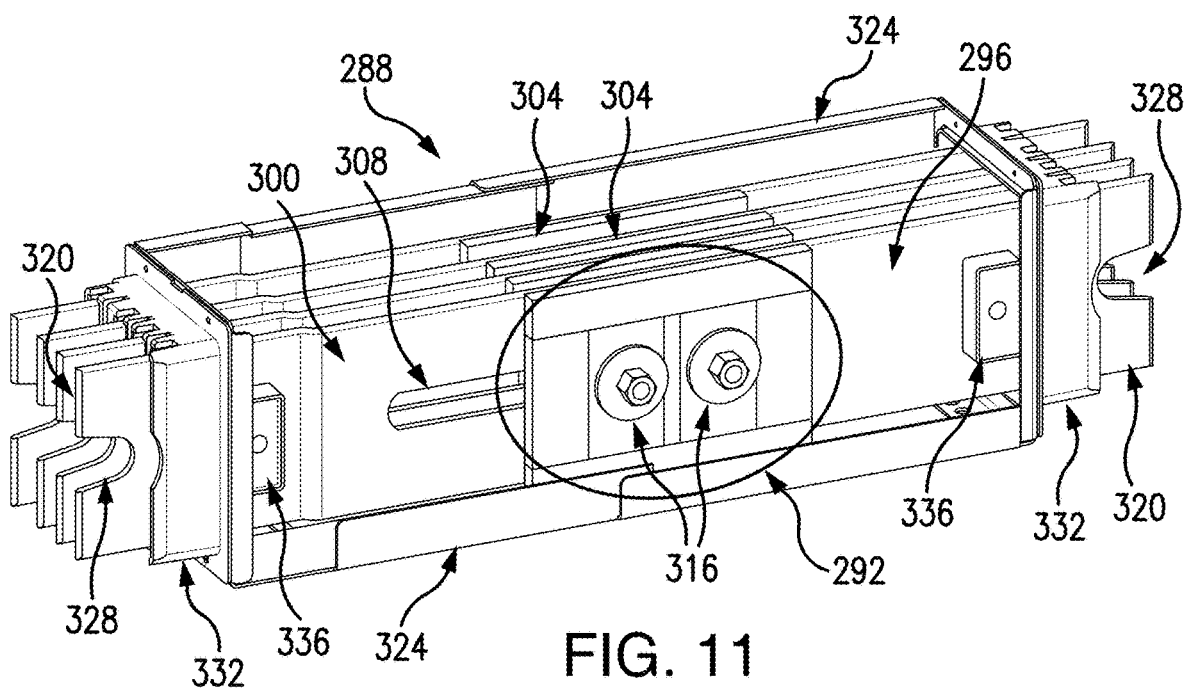
FIG. 11 illustrates an alternate construction of the through bus kit, according to one embodiment described herein.
Figure 12:
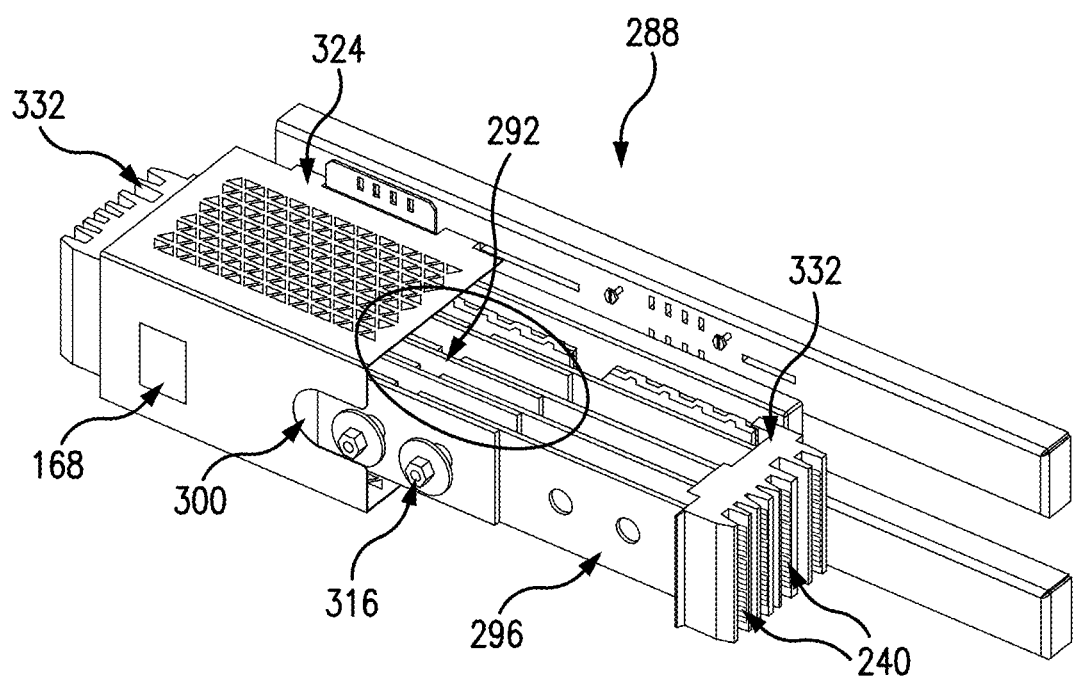
FIG. 12 illustrates an alternate construction of the through bus kit, according to one embodiment described herein.

An alternate construction for the through bus kit 124 is a bus bridge kit 288 as shown in FIGS. 11 and 12 (portions of the exterior metal covering are removed for a better view of the internal components). A bus bridge kit 288 can be easily installed into an otherwise completed modular electrical distribution device 100. A slidable portion 292 of the bus bridge kit 288 permits the overall length of the bus bridge kit 288 to be compressed to a minimum length for easy installation into an otherwise completed modular electrical distribution device 100 and then expanded to a length which permits making electrical connections with through bus kits 124 of adjacent modular electrical distribution device 100. The slidable portion 292 is accomplished by having right bus bridging busbar 296 and left bus bridging busbar 300 for each electrical phase. Electrical insulators 304 are placed between each phase to maintain the proper through air distance between electrical phases and prevent phase-to-phase arcing. The right bus bridging busbars 296 and left bus bridging busbars 300 are assembled such that the slidable portion 292 of the right bus bridging busbars 296 and left bus bridging busbars 300 are in juxtaposed position with each other. The slidable portion 292 of each of the right bus bridging busbars 296 and left bus bridging busbars 300 include coinciding longitudinal slots 308. The longitudinal slots 308 permit a variable sliding movement between the right and left bus bridging busbars, 296 and 300 respectively. The longitudinal slots 308 are for receiving one or more bolts 316. When the bolts 316 are loose or removed the right and left bus bridging busbars, 296 and 300 respectively, can move back and forth with respect to each other to compress or expand the overall length of the bus bridge kit 288. When the bolts 316 are tight the right and left bus bridging busbars, 296 and 300 respectively, cannot move back and forth with respect to each other. The bolts 316 are torqued to predetermined specific value (approximately 70 foot pounds) required for certifying the assembly of the bus bridge kit 288.

Figure 13:
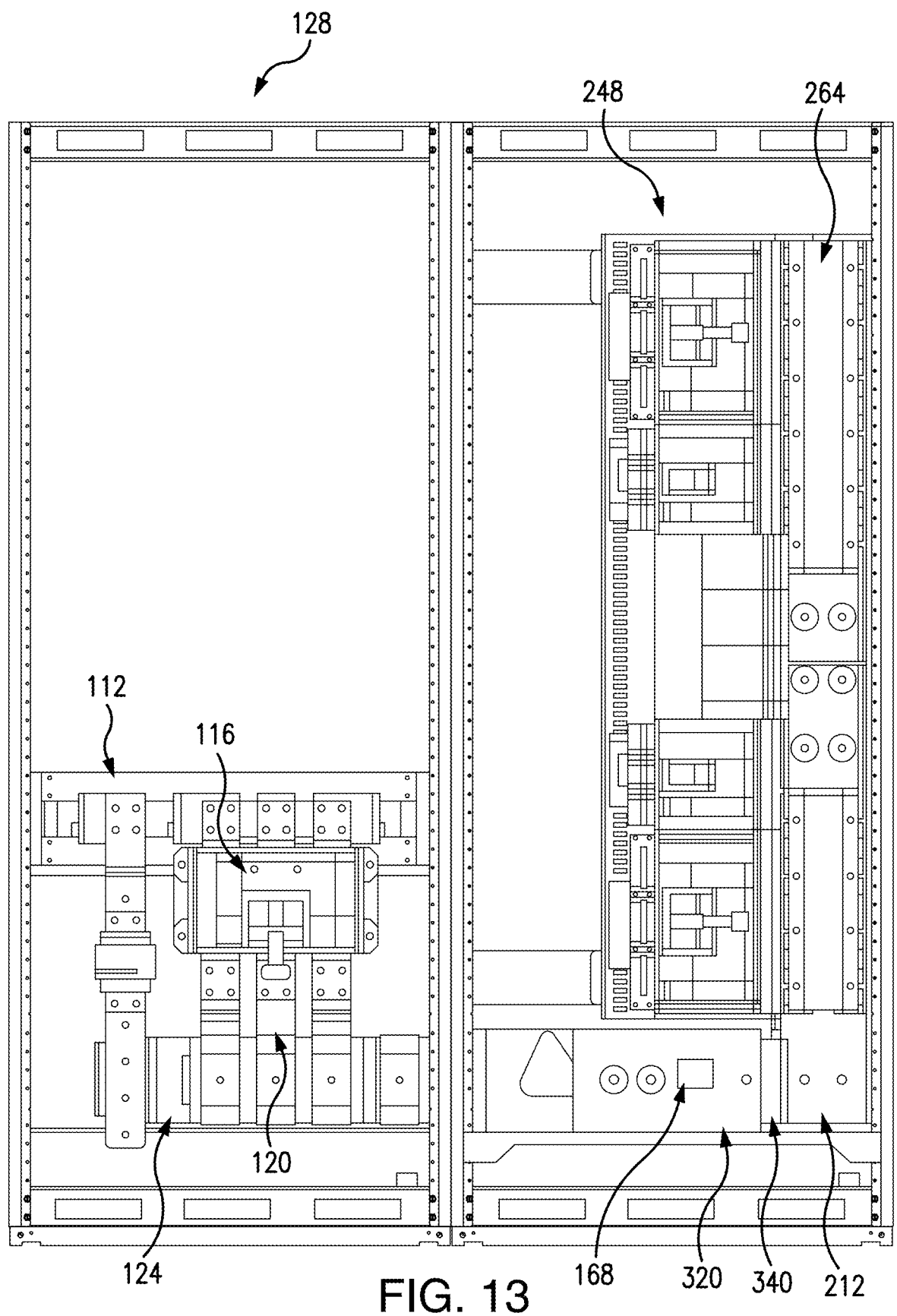
FIG. 13 illustrates a final assembly of a switchboard main section and a branch circuit breaker kit, according to one embodiment described herein.

Each of the right and left bus bridging busbars, 296 and 300 respectively, have an exterior end, 320, that extend outward from a slidable housing 324. The exterior ends 320, as shown in FIG. 11, have a longitudinal slot 328 configured for a bolted or joint pack 236 electrical connection, but can be configured for making an electrical connection with other bus bridging busbars 296 or 300, through bus busbars 212, load branch circuit breaker busses 264 or lighting panels 276. The exterior ends 320 are supported by end plates 332 made from a high strength nonconductive material and are prevented from moving with respect to the slidable housing 324 by clamps 336. In FIG. 12, the end plates 332 have embedded spring jaws 240 that provide a plug-on electrical connection wherein the electrical bus bars are forced into a gap between the embedded spring jaw connectors 240. FIG. 13 illustrates a final assembly of a switchboard main section 128 and a branch circuit breaker kit 248 using a through bus kit 124 and a bus bridge kit 288 with spring jaw connectors 240 in the end plates 332.

Figure 14:
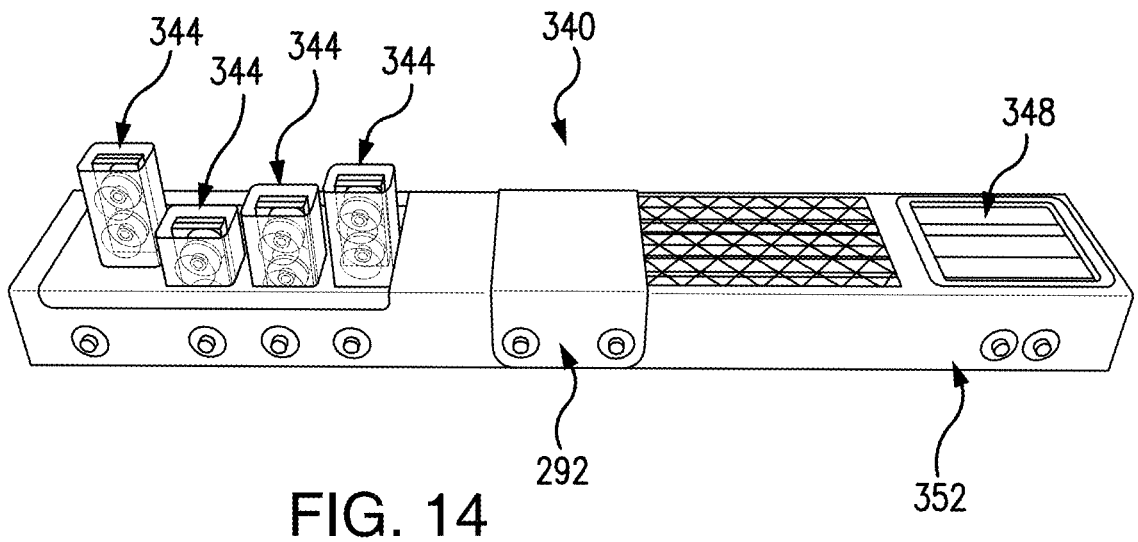
FIG. 14 illustrates a special through bus kit, according to one embodiment described herein.
Figure 15:
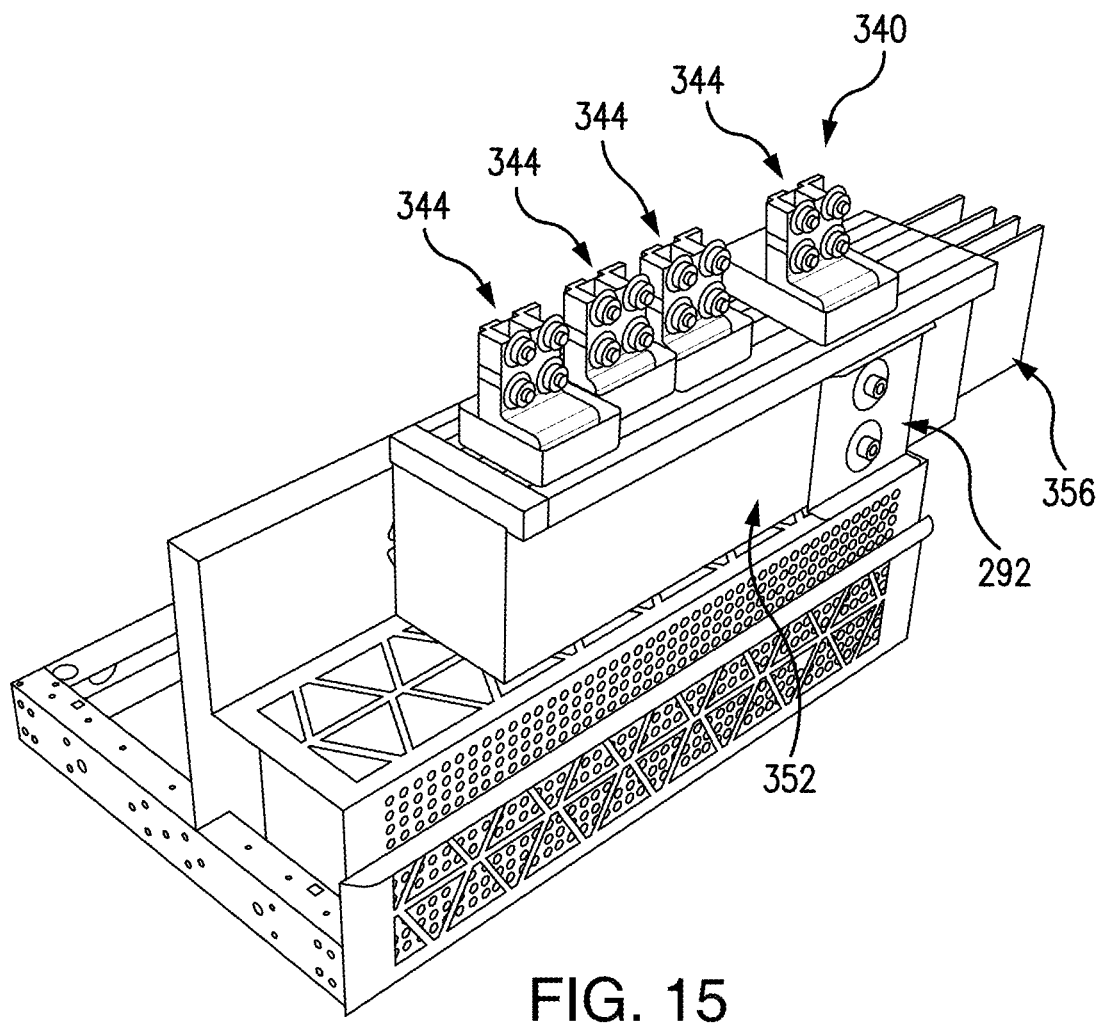
FIG. 15 illustrates an alternate construction of the special through bus kit, according to one embodiment described herein.

FIG. 14 illustrates special application bus bridge kit 340 which has the same slidable portion 292 described above with respect to FIGS. 11 and 12. The special application bus bridge kit 340 has special electrical terminals 344 for electrically connecting to a load bus kit 120 at one end and an opening 348 in housing 352 for receiving connector bus bars similar to through bus connector busbars 216 in FIG. 8 or a joint pack 236. FIG. 15 illustrates a slightly different configuration of special application bus bridge kit 340 wherein special electrical terminals 344 extend outwardly from one end of the housing 352 and special application bus bridge busbars 356 extend outwardly from the other end of the housing 352.

Figure 16:
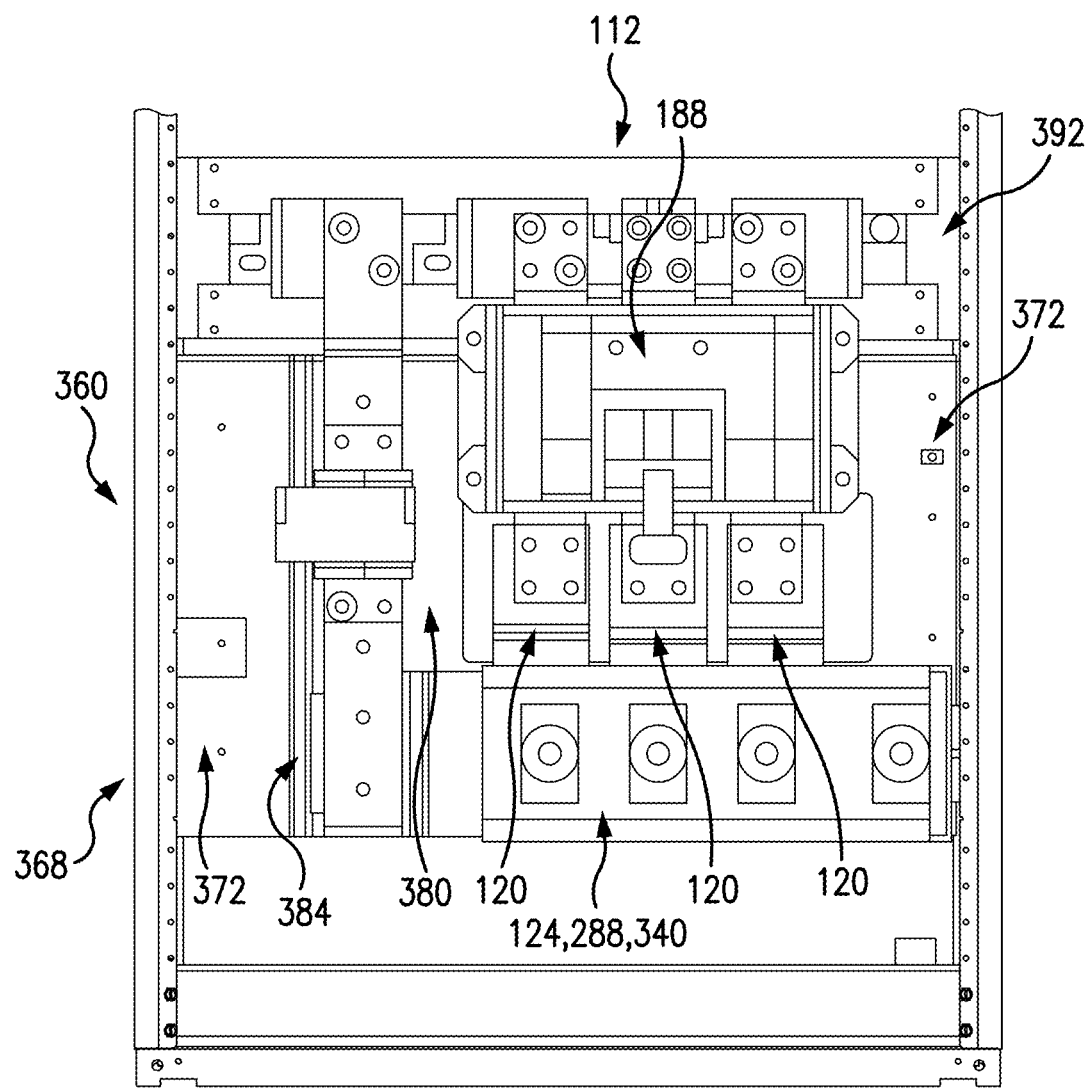
FIG. 16 illustrates an optional easy cabling kit in the closed position, according to one embodiment described herein.
Figure 17:
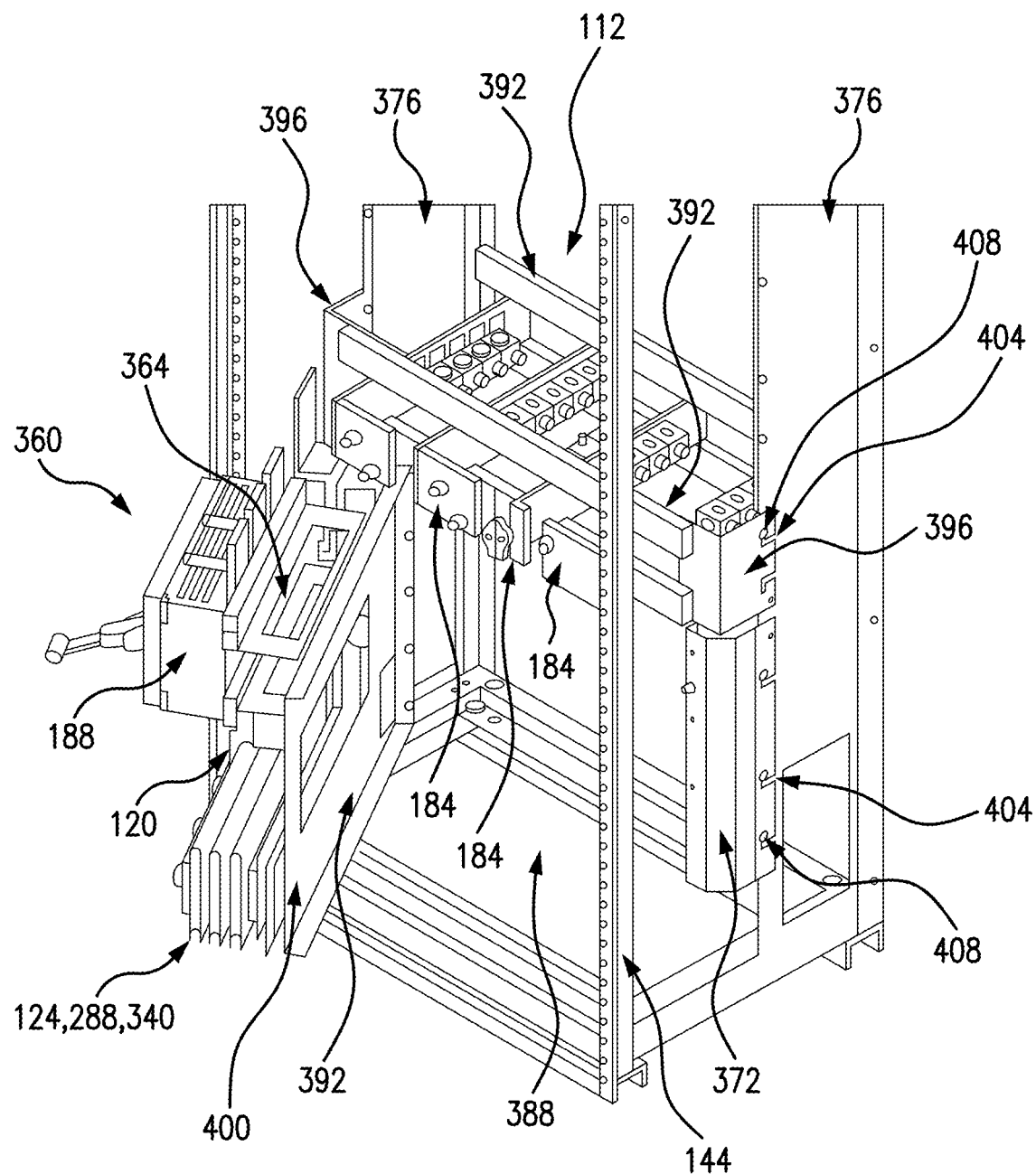
FIG. 17 illustrates an optional easy cabling kit in the open position, according to one embodiment described herein.

Referring now to FIGS. 16 and 17, an optional easy cabling kit 360 which, provides more room for pulling and connecting cables from the utility, is disclosed. The easy cabling kit 360 can be used with standard or slightly modified frame kits 108, line bus kits 112 (configured similar to the load bus kit 120), load bus kits 120, main breaker/fused switch kits 116 and through bus kits 124 to easily provide more room for pulling and connecting utility power cables to the line bus kit 112 and any other wiring that is normally located behind the main breaker/fused switch kit 116, load bus kit 120 and/or through bus kit 124. The easy cabling kit 360 includes a main breaker/fused switch mounting bracket 364 on which a standard main breaker/fused switch 188 can be mounted, and an easy cabling subframe 368 on which the mounting bracket 364 is installed. The easy cabling subframe 368 includes two fixed section 372, each being attached to one of two opposed side walls 376 of the electrical distribution device 100. The easy cabling subframe 368 also includes a movable section 380, which is rotatably attached to a first one of the two fixed sections 372 by a hinge 384. The hinge 384 permits the movable section 380, including a main breaker/fused switch 188 mounted on the main breaker/fused switch mounting bracket 364, a standard load bus kit 120 and a standard through bus kit 124, to be rotated away from the cabling area 388 as a single unit after the main breaker/fused switch 188 is disconnected from the line bus kit 112 and the through bus kit 124 has been disconnected from any adjacent through bus kits 124. The line bus subframe 392 is securely attached to the rear frame uprights 144 and opposed side walls 376 by line bus brackets 396, and therefore remains in place when the movable section 380 of the easy cabling subframe 368 is rotated away from the cabling area 388. When the movable section 380 is not rotated away from the cabling area 388, the movable end 400 of movable section 380 is securely attached to the second one of the two fixed section 372. The line bus brackets 396 and fixed sections 372 of the easy cabling subframe 368 are easily positioned on the side walls 376 and temporally supported by a combination of slots 404 and rivets 408. The slots 404 are generally L-shaped and the rivets 408 have two heads separated by a space that is slidingly received in the slot 404. In an alternative construction of the easy cabling kit 360 shown in FIG. 17, the front uprights 144 can be removed to provide additional cabling access.

The enclosure package kit (not shown) is the final assembly of the modular electrical distribution device 100. This kit includes side walls 376, a top 412 and front covers 416 for the assembled electrical distribution device 100. The side walls 376, top 412 and front covers 416 are attached to frame kit 108 uprights 144 by hardware 152 contained in the hardware package 164. The front covers 416 are metal panels that cover any exposed electrical connections, busbars or electrical cables contained inside the electrical distribution device 100 frame. They have openings for accessing the main breaker/switch handle and the handles of any enclosed branch circuit breakers 252 in the branch circuit breaker kit 248. The front covers 416 can be attached by hinges that permit the covers to easily be opened or by hardware 152 which must be removed to gain access to the branch circuit breaker kit 248 interior. The hardware package 164 contains the correct number, diameter, length, thread pitch and gauge of hardware 152 required for assembling the enclosure package. The number and type of walls, tops and covers provided in the enclosure package will depend on the type and configuration of the modular electrical distribution device 100 ordered.

Figure 18A:
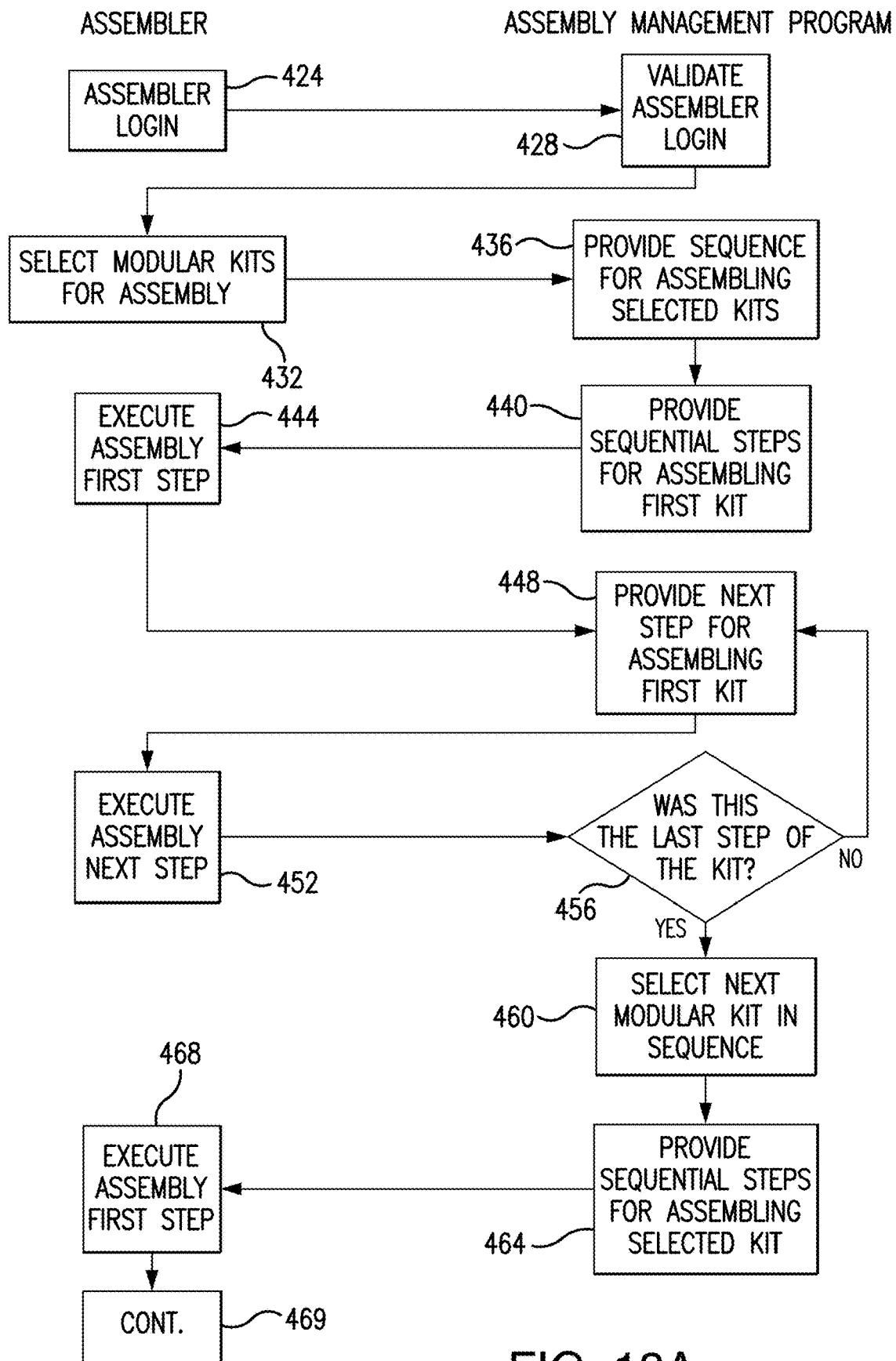
FIGS. 18A-B illustrate a flow chart of the assembly and certification process, according to one embodiment described herein.
Figure 18B:
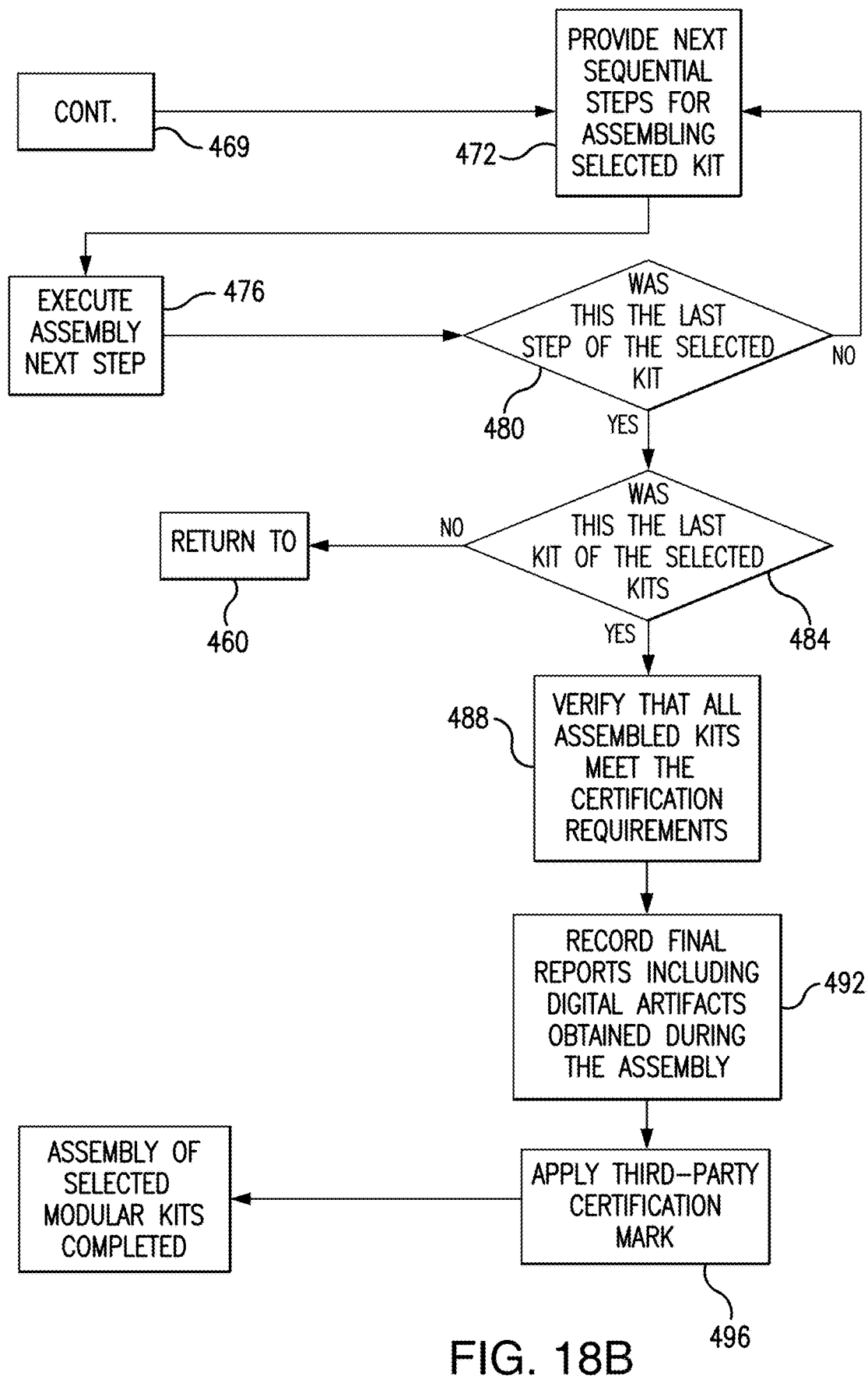

FIGS. 18A-B are flow charts illustrating assembly actions performed by the assembler and an assembly management program 420 stored in the digital storage repository 136, according to one embodiment described herein. In block 424 the assembler is logging on to the assembly management program 420. At block 428 the assembly management program 420 validates the assembler's login information. In block 432 the assembler selects the modular kits 104 that will be assembled for the modular electrical distribution device 100. At block 436 the assembly management program 420 will arrange the selected modular kits 104 in a sequence for assembling approved by the modular kit 104 manufacturer. At block 440 the assembly management program 420 will provide a sequential order, approved by the modular kit 104 manufacturer, for performing the assembly steps first modular kit 104 to be assembled. At block 444 the assembler will assemble the first step of the modular kit 104. At block 448 the assembly management program 420 will provide the next step in assembling the first step of the modular kit 104. At block 452 the assembler will assemble the next step of the modular kit 104 At block 456 the assembly management program 420 will determine if the executed assembly step at block 452 was the last step for assembling the first modular kit 104. If it was not the last step the assembly management program 420 will return to block 448 for providing then next assembly step. If it was the last assembly step for the modular kit 104 the assembly management program 420 will proceed to block 460 where the next modular kit 104 in the sequence of modular kits 104 will be selected for assembly. At block 464 assembly management program 420 will provide the sequential steps for assembly steps for the selected modular kit 104. At block 468 the assembler executes the first assembly step of the selected modular kit 104. At block 472 the assembly management program 420 will provide the next sequential step for assembly steps for the selected modular kit 104. At block 476 the assembler executes the next assembly step of the selected modular kit 104. At block 480 the assembly management program 420 will determine if the executed assembly step at block 476 was the last step for assembling the first modular kit 104. If it was not the last step the assembly management program 420 will return to block 472 where the next sequential step for assembly steps for the selected modular kit 104. If, at block 480, the assembly management program 420 determine that the executed assembly step at block 476 was the last step for assembling the first modular kit 104 it will proceed to block 484. At block 484 the assembly management program 420 will determine if the assembly step at block 476 was the last assembly step of the last modular kit 104 of the selected modular kits 104. If it was not the last modular kit 104 of the selected modular kits 104 the assembly management program 420 will return to block 460. If the assembly management program 420 determines that the assembly step at block 476 was the last assembly step of the last modular kit 104 of the selected modular kits 104 it will proceed to block 488 where all of the information 140 discovered during the assembly of the selected modular kits 104 including any digital artifacts obtained during the assembly will be processed to verify that all of the assembled kits 104 meet the certification requirements of the certifying third-party. The assembly management program 420 then proceeds to block 492 where the final report of the assembly including the stored information 140 will be recorded in the digital storage repository 136. The assembly management program 420 then proceeds to block 496 where the certifying third-party's certification mark can be applied to the modular electrical distribution device 100. At block 500 the assembler's job is completed.

Figure 19:
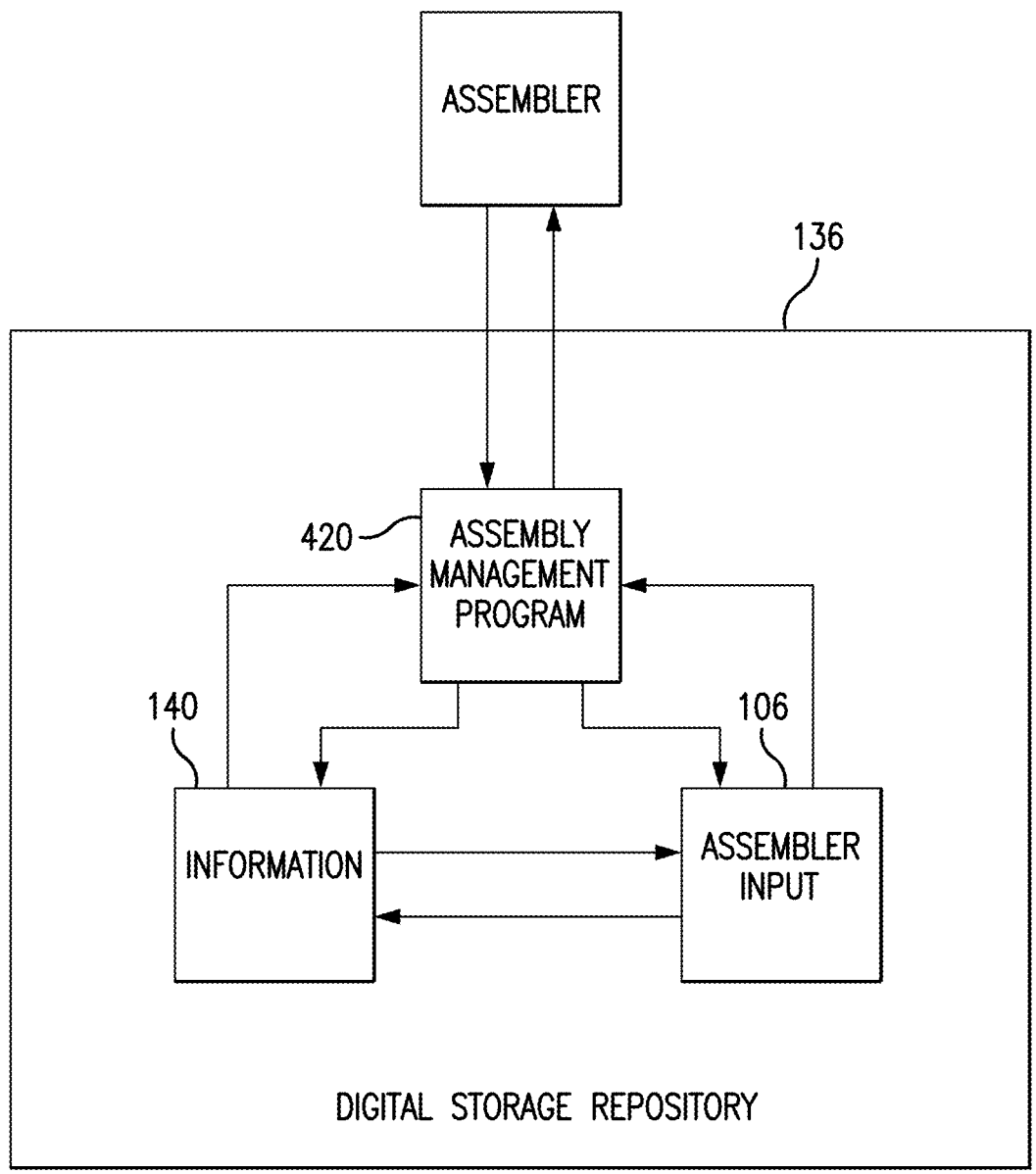
FIG. 19 illustrates a digital storage repository storing information and user inputs as well as an assembly management program that is in communication with an assembler.

FIG. 19 is a block diagram of the assembly management program 420, which is. The assembly management program 420 is in two-way communication with the stored information 140 and the assembler's inputs 106, which are stored in the digital storage repository 136 and the assembler.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A system comprising:
 a plurality of prepackaged modular kits selected from a variety of modular kits and configured to be field assembled to form a field assembled modular electrical distribution device, the plurality of prepackaged modular kits including:
 a frame kit having multiple unassembled pieces configured to be field assembled to form a frame that, once assembled, is configured to support other field-assembled prepackaged modular kits of the plurality of prepackaged modular kits;
 a line bus kit having line bus substructures and a plurality of line bus bus bars that are unassembled, the line bus substructures configured to be field assembled and further configured to be secured in the field to the assembled frame kit and to support the plurality of line bus bus bars, the plurality of line bus bus bars configured to be mounted to the line bus substructures while being electrically isolated from one another and electrically connecting a main breaker/fused switch kit to a utility power source; and a load bus kit having load bus substructures and a plurality of load bus bus bars that are unassembled, the load bus substructures configured to be field assembled and further configured to be secured in the field to the assembled frame kit and to support the plurality of load bus bus bars, the plurality of load bus bus bars configured to be mounted to the load bus substructures while being electrically isolated from one another and electrically connecting the main breaker/fused switch kit to a through bus kit, the through bus kit electrically connecting to a through bus kit of an adjacent field assembled modular electrical distribution device; and computer logic, at least portion of which is remote from a field of assembly of the field assembled modular electrical distribution device, the computer logic being configured to verify that each of the plurality of prepackaged modular kits is assembled according to a certified method of a certifying third party by an assembler of the field assembled modular electrical distribution device such that the field assembled modular electrical distribution device meets same compliance requirements as a factory assembled electrical distribution device and is eligible for the certifying third-party's certification mark, by causing the following steps to be executed:

receiving, from the assembler via the at least one wired network, the selection of the plurality of prepackaged modular kits to be assembled from the variety of modular kits and, in response, providing via the at least one wired network a plurality of sequential assembly steps including a sequence for assembling the plurality of prepackaged modular kits and sequential assembly steps for assembling each of the plurality of prepackaged modular kits;

controlling performance of the plurality of sequential assembly steps for assembling the plurality of prepackaged modular kits by only communicating, via the at least one wired network, a next assembly step of the plurality of sequential assembly steps after receiving a verification via the at least one wired network that performance of a particular prior step of the plurality of sequential assembly steps is completed per requirements for certification by the third party, with a verification per the requirements for the certification by the third party of completion of at least one step of the plurality of sequential assembly steps being evidenced by a digital signal output by at least one sensor; and upon determining that compliance has been achieved for the assembled modular electrical distribution device to be eligible for the third party's certification mark based on a verification of the completion of the plurality of sequential assembly steps, recording, in a digital storage repository, a final assembly report for the field assembled modular electrical distribution device.

2. The system of claim 1, wherein the frame kit includes uprights to which the selected kits of the field assembled modular electrical distribution device are attached and a top and a bottom connecting the uprights together structurally and establishing a footprint of the field assembled modular electrical distribution device.

3. The system of claim 1, wherein a scannable matrix or 2 D barcode is attached to one member of each of the various prepackaged modular kits at a location that is visible after assembly of the field assembled modular electrical distribution device is complete, the matrix or 2 D barcode providing access to information describing each component of the plurality of prepackaged modular kits being assembled.

4. The distribution device-system of claim 1, wherein each of the various prepackaged modular kits includes a hardware package containing all of the hardware required for assembling the modular kit.

5. The system of claim 1, wherein the certification received is further based on verification that the assembler is certified by a manufacturer of the various prepackaged modular kits and verification that the assembler has particular electrical and mechanical skills and an ability to use an augmented reality device in assembling a field assembled modular electrical distribution device.

6. The system of claim 1, wherein receiving the instructions includes, in response to the assembler interacting with an augmented reality device, receiving a display via the augmented reality device of the plurality of sequential assembly steps.

7. The system of claim 6, wherein the augmented reality device is configured to control the sequence of the sequential assembly steps performed by the assembly by only showing a next assembly step of the plurality of sequential assembly steps after verification that performance of a particular prior step of the plurality of sequential assembly steps is completed.

8. The system of claim 1, wherein the computer logic is coupled to a digital storage repository for storing information about the assembly of each of the various prepackaged modular kits being assembled in each field assembled modular electrical distribution device, wherein the captured digital artifacts are included in the information about the assembly.

9. The system of claim 8, wherein the certified plurality of sequential assembly steps and/or the eligibility of the certification is further determined by the remote computing system based on any or all of an original order number for the field assembled modular electrical distribution device, an order specific bill of materials, a listing of the selected modular kits per the order, electrical rating information, information about assembly hardware used in assembling identification of the plurality of prepackaged modular kits, certification information about certification of the assembler, digital inputs from the assembler after completing each of the sequential assembly steps, visual records included in the digital artifacts showing completion of the respective sequential assembly steps performed, results of electrical performance tests on the field assembled modular electrical distribution device, and a performance and a traceability database for recording any subsequent maintenance, usage and performance of the field assembled modular electrical distribution device.

10. The system of claim 9, wherein the information stored in the digital storage repository is used to determine whether the field assembled modular electrical distribution device meets compliance requirements for assembly of the field assembled modular electrical distribution device and is eligible for the certifying third party's certification mark.

11. The system of claim 1, the plurality of prepackaged modular kits further comprising an enclosure kit, wherein the enclosure kit includes side walls, a top and a front cover for enclosing the frame kit.

12. The system of claim 1, the plurality of prepackaged modular kits further comprising a cabling access kit, wherein the load bus kit, through bus kit and main breaker/fused switch kit are mounted on the cabling access kit, which can be rotated away from a cabling area to provide more room for pulling and connecting utility power cables.

13. The system of claim 12, wherein the cabling access kit includes:
- a cabling subframe having two fixed sections each being securely attached to opposing side walls of the field assembled modular electrical distribution device and a movable section attached to a first one of the two fixed sections by a hinge;
- a main breaker/fused switch mounting bracket on which the main breaker/fused switch kit and the load bus kit, once electrically connected to main breaker/fused switch kit, are mounted; and
- a through bus kit electrically connected to the load bus kit; wherein the main breaker/fused switch mounting bracket and the through bus kit are mounted on the movable section of the subframe such that the main breaker/fused switch kit, load bus kit and through bus kit can be rotated away from the cabling area as a unit when the main breaker/fused switch kit is electrically disconnected from the line bus kit and the through bus kit is electrically disconnected from any adjacent through bus kit.

14. The system of claim 1, the plurality of prepackaged modular kits further comprising at least one of:
- a branch circuit breaker kit configured for installation of multiple branch circuit breakers; and
- a lighting panel kit configured for installation of multiple light controlling switches.

15. The system of claim 1, the plurality of prepackaged modular kits further comprising a bus bridge kit configured with a variable length for easier installation in the field assembled modular electrical distribution device, the bus bridge kit having a right busbar and a left busbar for each electrical phase for accomplishing the variable length, the right and left busbars having a slidable portion where the right busbar and left busbar are in juxtaposed position with each other, and a longitudinal slot in each of the right and left busbars in a slidable portion of the right and left busbars permits a bolted electrical connection between the right and left busbars.

16. The system of claim 8, wherein a digital storage repository coupled to the computer logic is remote from the field, wherein the digital storage repository is accessible by the certifying third party and stores information about the assembly of the prepackaged modular kits, including the digital artifacts.

17. The system of claim 1, further wherein the through bus kit includes a bus bridge kit, the bus bridge kit comprising:
- opposing electrically conductive first and second ends along a longitudinal axis of the bus bridge kit; and
- an extendable portion extendable and retractable along the longitudinal axis between a compressed position in which the bus bridge kit is shorter and an expanded position in which the bus bridge is longer.

18. The system of claim 17, wherein the expandable portion includes at least one sliding part that slides when the expandable portion moves towards either of the compressed position or the expendable position.

19. The system of claim 17, wherein the expandable portion is configured to be temporarily secured to prevent extension or retraction.

20. The system of claim 17, wherein the first and second ends are each provided with an electrical connector that is configured to electrically connect with an electrical connector of another bus bridge kit or the other through bus kit.

* * * * *